United States Patent
Glaesser et al.

(10) Patent No.: US 10,840,571 B2
(45) Date of Patent: Nov. 17, 2020

(54) MOTOR VEHICLE WITH A COOLED UNIT AREA ARRANGED INSIDE THE MOTOR VEHICLE BODY

(71) Applicant: Bayerische Motoren Werke Aktiengesellschaft, Munich (DE)

(72) Inventors: Juergen Glaesser, Eching (DE); Klaus Amberger, Bernau (DE); Oliver Haff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 888 days.

(21) Appl. No.: 15/487,595

(22) Filed: Apr. 14, 2017

(65) Prior Publication Data

US 2017/0222286 A1 Aug. 3, 2017

Related U.S. Application Data

(63) Continuation of application No. PCT/EP2015/074077, filed on Oct. 19, 2015.

(30) Foreign Application Priority Data

Oct. 17, 2014 (DE) .................. 10 2014 221 156

(51) Int. Cl.
*H01M 10/663* (2014.01)
*H01M 10/625* (2014.01)
(Continued)

(52) U.S. Cl.
CPC ............ *H01M 10/663* (2015.04); *B60H 1/28* (2013.01); *B60K 1/04* (2013.01); *B60K 11/06* (2013.01);
(Continued)

(58) Field of Classification Search
None
See application file for complete search history.

(56) References Cited

U.S. PATENT DOCUMENTS

| 6,302,228 B1 | 10/2001 | Cottereau et al. |
| 2004/0163398 A1 | 8/2004 | Morishita et al. |

(Continued)

FOREIGN PATENT DOCUMENTS

| CN | 101386285 A | 3/2009 |
| DE | 43 13 783 C1 | 8/1994 |

(Continued)

OTHER PUBLICATIONS

Chinese-language Office Action issued in counterpart Chinese Application No. 201580055133.1 dated Mar. 8, 2019 with English translation (15 pages).

(Continued)

*Primary Examiner* — Karie O'Neill Apicella
(74) *Attorney, Agent, or Firm* — Crowell & Moring LLP

(57) ABSTRACT

A motor vehicle has a unit area which is arranged inside the motor vehicle body. The unit area has at least one air inlet and at least one air outlet. The unit area is divided into at least one cold area and at least one warm area which is isolated from the cold area by a separating wall. The warm area accommodates at least one unit emitting heat and the air emerging from the air outlet and entering into the air inlet flows through at least the warm area.

11 Claims, 1 Drawing Sheet

(51) Int. Cl.
  *H01M 10/6561* (2014.01)
  *H01M 10/613* (2014.01)
  *H01M 10/63* (2014.01)
  *B60K 11/06* (2006.01)
  *B60K 11/08* (2006.01)
  *H01M 10/48* (2006.01)
  *B60H 1/28* (2006.01)
  *B60K 1/04* (2019.01)
  *B60L 58/26* (2019.01)
  *B60K 1/00* (2006.01)

(52) U.S. Cl.
  CPC .............. *B60K 11/08* (2013.01); *B60L 58/26* (2019.02); *H01M 10/486* (2013.01); *H01M 10/613* (2015.04); *H01M 10/625* (2015.04); *H01M 10/63* (2015.04); *H01M 10/6561* (2015.04); *B60K 2001/005* (2013.01); *B60K 2001/0411* (2013.01); *H01M 2220/20* (2013.01)

(56) References Cited

U.S. PATENT DOCUMENTS

| | | |
|---|---|---|
| 2006/0232106 A1 | 10/2006 | Haas |
| 2009/0071178 A1 | 3/2009 | Major et al. |
| 2014/0014421 A1 | 1/2014 | Carpenter et al. |

FOREIGN PATENT DOCUMENTS

| | | | |
|---|---|---|---|
| DE | 198 11 189 C1 | 9/1999 | |
| DE | 102 48 188 A1 | 5/2004 | |
| DE | 10 2010 053 471 A1 | 6/2012 | |
| EP | 0 982 168 A1 | 3/2000 | |
| FR | 2 677 933 A1 | 12/1992 | |
| FR | 2 949 096 A3 | 2/2011 | |
| FR | 2949096 A3 * | 2/2011 | .............. B60L 50/66 |
| KR | 10-2008-0037431 A | 4/2008 | |
| WO | WO 03/064199 A1 | 8/2003 | |

OTHER PUBLICATIONS

International Search Report (PCT/ISA/210) issued in PCT Application No. PCT/EP2015/074077 dated Jan. 20, 2016 with English-language translation (four (4) pages).

German-language Written Opinion (PCT/ISA/237) issued in PCT Application No. PCT/EP2015/074077 dated Jan. 20, 2016 (five (5) pages).

German Search Report issued in counterpart German Application No. 10 2014 221 156.5 dated Apr. 14, 2015 with partial English-language translation (thirteen (13) pages).

Chinese-language Office Action issued in counterpart Chinese Application No. 201580055133.1 dated Sep. 4, 2018 with English translation (13 pages).

* cited by examiner

MOTOR VEHICLE WITH A COOLED UNIT AREA ARRANGED INSIDE THE MOTOR VEHICLE BODY

CROSS REFERENCE TO RELATED APPLICATIONS

This application is a continuation of PCT International Application No. PCT/EP2015/074077, filed Oct. 19, 2015, which claims priority under 35 U.S.C. § 119 from German Patent Application No. 10 2014 221 156.5, filed Oct. 17, 2014, the entire disclosures of which are herein expressly incorporated by reference.

BACKGROUND AND SUMMARY OF THE INVENTION

The present invention relates to a motor vehicle with a unit area arranged inside a motor vehicle body. In particular, the invention relates to a motor vehicle in which the unit area is formed in a region in front of and below the windshield, in what is referred to as the water tank.

In the unit area of conventional vehicles, in particular if said unit area is formed in the water tank arranged in front of and below the windshield, the waste heat of the electric components installed there builds up. This has the consequence that the number of electric components which can be installed there is limited. However, it is frequently desirable to install electric components which should be accommodated in a manner protected from spray, such as, for example, a high voltage battery, specifically in this region of the vehicle.

It is the object of the present invention to provide a motor vehicle with a unit area which is arranged inside a motor vehicle body and in which overheating of the components installed in the unit area is avoided even when some of these components are electric components with a high heat output.

This and other objects are achieved by a motor vehicle according to the invention, wherein the unit area has at least one air inlet and at least one air outlet, and wherein the unit area is divided into at least one cold region and at least one warm region sealed off from the cold region by a partition. The warm region accommodates at least one heat-emitting unit, and the air entering through the air inlet and emerging through the air outlet flows at least through the warm region.

By use of this configuration according to the invention, cost-effective cooling of electric components in the unit area is obtained, and the unit area is thus capable of accommodating temperature-critical electric components. The separation between warm region and cold region of the unit area makes it possible both to install heat-emitting components in the unit area (in the warm region) and also to provide components (in the cold region), the subjecting of which to excessive heat is undesirable.

In an advantageous embodiment of the invention, the warm region has a battery housing for a vehicle battery forming a unit. The vehicle battery is provided in the battery housing and is protected there against undesirable environmental influences, for example moisture.

It is particularly of advantage here if the battery housing has at least one air entry opening and at least one air exit opening, wherein the air entry opening leads into the unit area.

The battery housing is preferably designed for the passage of at least some of the air flowing into the warm region of the unit area. Some of the air entering the unit area can thus flow through the battery housing, as a result of which heat emitted by the battery is removed by the air flowing through the battery housing. The warm air emerging from the air exit opening is preferably not conducted again into the unit area, but rather is guided directly to the outside from the unit area. This embodiment is particularly advantageous if the battery housing is configured geometrically and functionally in such a manner that the components contained therein (battery, control device) are cooled by the air flowing therethrough without being damaged due to moisture or wetness. This can be achieved by the fact that the battery housing is provided with integrated throughflow ducts for the air. These throughflow ducts can surround, for example, the actual receiving space for the components and can be sealed off from the receiving space by thin walls which readily conduct heat.

In another preferred embodiment of the invention that can be combined with the embodiment described above, a cab air inlet for ventilating a vehicle cab is provided in the unit area, in particular in the cold region. The arrangement of the cab air inlet in the cold region of the unit area prevents waste heat from the electric components provided in the warm region from entering the vehicle cab. This embodiment of the invention is advantageous, in particular, if the cab air inlet is formed in a heating and air conditioning system for air conditioning the vehicle cab. The shielding of the cab air inlet from the waste heat of the warm region then namely reduces the required cooling power of the air conditioning system, as a result of which the $CO_2$ emission of the motor vehicle can be kept low.

Particularly advantageous is an embodiment of the motor vehicle according to the invention that can be combined with other embodiments and in which the at least one air inlet of the unit area is arranged in a region of the motor vehicle body in which the relative wind striking against the vehicle produces a positive pressure, and/or in which the at least one air outlet of the unit area is arranged in a region of the motor vehicle body in which the relative wind striking against the vehicle produces a negative pressure. This configuration uses the kinetic energy of the relative wind for ventilating the unit area without an active ventilation device, such as, for example, a fan, being required. This also has the effect of saving energy and reducing the $CO_2$ emission of the internal combustion engine of the vehicle.

It is also advantageous if the at least one air inlet and/or the at least one air outlet of the unit area is provided with a device controlling the effective flow cross section. As a result, the ventilation of the unit area can be controlled to meet requirements.

Even in the case of the variant with a ventilated battery housing, it is advantageous for the same reasons if the at least one air entry opening and/or the at least one air exit opening of the battery housing is provided with a device controlling the effective flow cross section.

In both variants above, it is advantageous if the device controlling the effective flow cross section is acted upon by a control device which uses a measured temperature as a control variable. The needs-based control can thereby be controlled depending on a measured temperature, for example a temperature in the warm region of the unit area, or on a temperature in the battery housing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
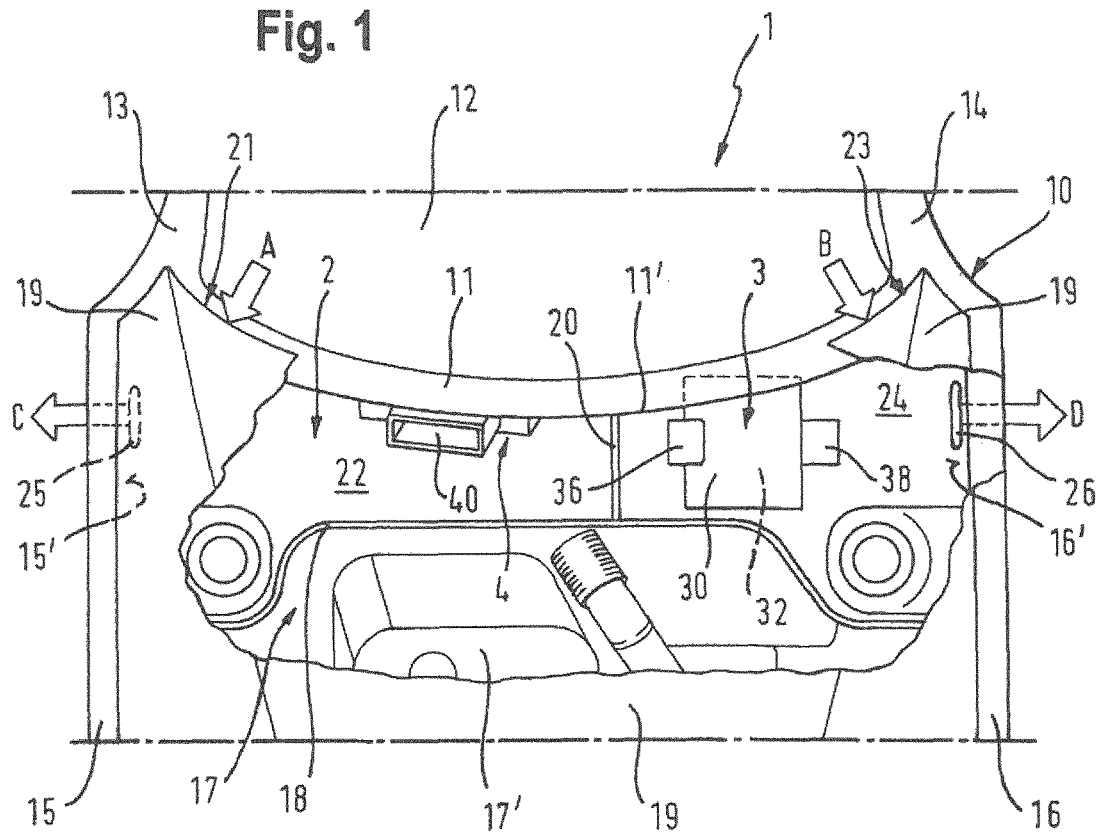
FIG. 1 is a schematic, partially sectioned top view of a unit area arranged below and in front of the windshield of a motor vehicle according to an embodiment of the invention.

FIG. 1 illustrates the front portion of a motor vehicle 1, with a motor vehicle body 10 in a partially sectioned top view. The shown portion of the motor vehicle 1 extends from a windshield 12 which is accommodated between two A pillars 13, 14 of the motor vehicle body 10. The lower edge of the windshield 12 is adjacent to a cowl 11 of the motor vehicle body 10. Furthermore, two front fenders 15, 16 are shown between which an engine compartment 17 having an engine 17' arranged therein extends in the front region of the motor vehicle 1. A front interior wall 11' delimits the vehicle interior to the front below the windshield 12. A unit area 2 is formed between the front interior wall 11' and the engine compartment 17. The unit area 2 is frequently also referred to as a water tank. A front transverse bulkhead 18 forms a boundary wall between the unit area 2 and the engine compartment 17. An engine compartment cover 19 (only partially illustrated in the figure) upwardly closes off the engine compartment 17 and the unit area 2 in the closed state of the engine compartment cover 19.

The unit area 2 is divided into a cold region 22 and a warm region 24 by an intermediate wall 20 which extends from the front interior wall 11' as far as the transverse bulkhead 18. At least one heat-emitting unit 3 which, in the example shown has an electric battery, is installed in the warm region 24. Of course, other heat-emitting units, preferably electric or electronic components, can alternatively or additionally be provided in the warm region 24.

A cab air inlet 40 of a heating and air-conditioning device 4 which supplies the vehicle interior with air-conditioned fresh air (only illustrated schematically in the figure) is provided in the cold region 22.

Formed between the windshield-side rear end portion of the engine compartment cover 19 and the cowl 11, both on the side of the cold region 22 and of the warm region 24, is at least one respective air inlet 21, 23 through which fresh air can flow from the outside into the unit area 2, as illustrated symbolically by the arrows A and B. The position of the air inlets 21, 23 has been consciously selected at this location in front of the lower edge of the windshield 12 since the relative wind approaching the motor vehicle 1 produces a positive pressure area in this region.

Provided in the respective lateral boundary wall 15', 16' of the unit area 2, said boundary wall facing the fender 15, 16, is in each case at least one air outlet 25, 26 through which air can emerge out of the unit area 2, i.e. out of the cold region 22 or out of the warm region 24, as is illustrated symbolically by the arrows C and D. The air outlets 25 and 26 are consciously provided at this location since there is a negative pressure area in the region of the respective fender interior while relative wind flows around the vehicle. The provision of the air outlet 25 for the cold region 22 is not absolutely necessary. However, both an air inlet 23 and an air outlet 26 are provided in the warm region 24 such that fresh air flows through the warm region 24.

Figure 2:
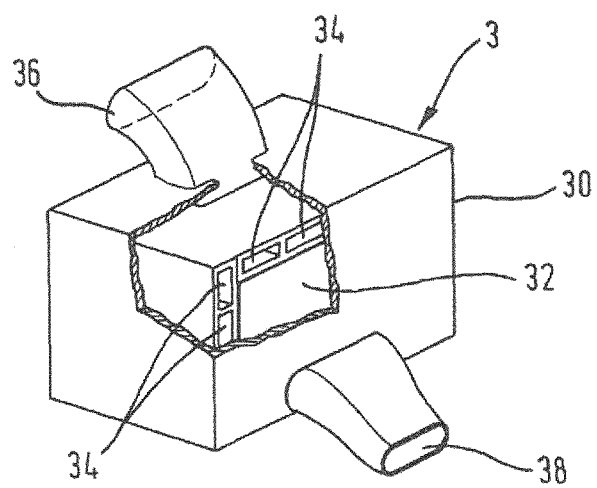
FIG. 2 is a partially sectioned perspective view of a battery housing through which air can flow.

The unit 3 having the electric battery 32 in the warm region 24 of the unit area 2 is formed by a battery housing 30 in which the electric battery 32 is accommodated in a manner protected against environmental influences. The battery housing 30 surrounds the battery 32, wherein flow ducts 34, which are fluidically connected to at least one air entry opening 36 and at least one air exit opening 38 of the battery housing 30, are formed between the wall of the battery housing 30 and the battery 32. This construction of the battery housing 30 that is illustrated in FIG. 2 makes it possible for fresh air to enter through the air entry opening 36 into the flow ducts 34 in the interior of the battery housing 30 and to exit from there out of the flow ducts 34 through the air exit opening 38 to the outside again. This flow through the battery housing 30 permits particularly effective removal of the heat emitted by the battery 32 from the interior of the battery housing 30. It is of advantage here if the air outlet opening 38 opens directly through the side wall 16' into the negative pressure area in the interior of the fender 16 since the pressure difference between the warm region 24 and the negative pressure area then causes a forced flow.

The targeted ventilation according to the invention of the warm unit area, i.e. of the warm region 24, with at least one air inlet 23 in an outer positive pressure area and the targeted venting of the warm unit area by at least one opening, forming an air outlet 26, in a side wall of the unit area 2 either into the interior of the fender 16 or directly through the outer wall of the vehicle body 10 uses the aerodynamic forces of the relative wind for the forced ventilation of the warm region 24. To control the intensity of the ventilation, control elements which influence the respective flow cross section can be provided either at the air inlet 23 or at the air outlet 26. Such a control element can be, for example, a bimetal and can undergo a change in shape which is dependent on the temperature and by which the flow cross section is changed. Of course, the ventilation of the cold region 22 can also be controlled in this manner.

The invention is not restricted to the above exemplary embodiment which serves merely for the general explanation of the core concept of the invention. On the contrary, within the scope of protection, the device according to the invention can also assume other embodiments than those described above.

Reference signs in the claims, the description and the drawings serve merely for better understanding of the invention and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a unit area arranged inside a motor vehicle body completely in front of and below a windshield of the motor vehicle between a transverse bulkhead of an engine compartment and a front interior wall which delimits a front of a vehicle cabin, wherein
   the unit area has at least one air inlet and at least one air outlet,
   the unit area is divided into at least one cold region and at least one warm region sealed off from the cold region by a partition extending from the front interior wall to the transverse bulkhead,
   the warm region accommodates at least one heat-emitting unit, and
   air entering through the air inlet and emerging through the air outlet flows through at least the warm region.

2. The motor vehicle as claimed in claim 1, wherein
   the warm region has a battery housing for a vehicle battery forming the heat emitting unit.

3. The motor vehicle as claimed in claim 2, wherein
the battery housing has at least one air entry opening and at least one air exit opening, and
the air entry opening opens into the warm region of the unit area.

4. The motor vehicle as claimed in claim 3, wherein
the battery housing is configured for passage of at least some of the air flowing into the warm region of the unit area.

5. The motor vehicle as claimed in claim 1, further comprising:
a cab air inlet for ventilating a vehicle cab, wherein
the cab air inlet is provided in the unit area in the cold region.

6. The motor vehicle as claimed in claim 5, wherein
the cab air inlet is formed in a heating and air conditioning system for air conditioning the vehicle cab.

7. The motor vehicle as claimed in claim 1, wherein
the at least one air inlet of the unit area is arranged in a region of the motor vehicle body in which relative wind striking against the motor vehicle produces a positive pressure, and/or
the at least one air outlet of the unit area is arranged in a region of the motor vehicle body in which the relative wind striking against the motor vehicle produces a negative pressure.

8. The motor vehicle as claimed in claim 1, wherein
the at least one air inlet and/or the at least one air outlet of the unit area is provided with a device controlling an effective flow cross section.

9. The motor vehicle as claimed in claim 3, wherein
the at least one air entry opening and/or the at least one air exit opening of the battery housing is provided with a device controlling the effective flow cross section.

10. The motor vehicle as claimed in claim 8, wherein
the device controlling the effective flow cross section is acted upon by a control device which uses a measured temperature as a control variable.

11. The motor vehicle as claimed in claim 9, wherein
the device controlling the effective flow cross section is acted upon by a control device which uses a measured temperature as a control variable.

* * * * *